(12) United States Patent
Nishikawa

(10) Patent No.: US 6,204,950 B1
(45) Date of Patent: Mar. 20, 2001

(54) OPTICAL-FIBER-AMPLIFIER MEASURING APPARATUS

(75) Inventor: Tomoyuki Nishikawa, Tokyo (JP)

(73) Assignee: Ando Electric Co., Ltd., Tokyo (JP)

( * ) Notice: Subject to any disclaimer, the term of this patent is extended or adjusted under 35 U.S.C. 154(b) by 0 days.

(21) Appl. No.: 09/399,329

(22) Filed: Sep. 20, 1999

(30) Foreign Application Priority Data

Sep. 30, 1998 (JP) .................................................. 10-294571

(51) Int. Cl.[7] .............................................................. H01S 3/19
(52) U.S. Cl. ............................ 359/244; 359/245; 359/246
(58) Field of Search .................................... 359/244, 245, 359/246, 237, 238; 250/227.21, 227.14; 356/73, 73.1

(56) References Cited

U.S. PATENT DOCUMENTS 5,986,784 * 11/1999 Kersey et al. .................. 359/246

* cited by examiner

Primary Examiner—Hung Xuan Dang
(74) Attorney, Agent, or Firm—Finnegan, Henderson, Farabow, Garrett & Dunner, L.L.P.

(57) ABSTRACT

An optical-fiber-amplifier measuring apparatus includes: a light source 14 for measuring various characteristics of an optical fiber amplifier 22 to be measured; an acoustooptic modulator 16 for modulating an optical signal inputted from the light source 14 to the optical fiber amplifier 22 to be measured; a light source 10 for setting the optical fiber amplifier 22 to be measured in a saturated state; and an acoustooptic modulator 12 for modulating an optical signal inputted from the light source 10 to the optical fiber amplifier 22 to be measured.

4 Claims, 5 Drawing Sheets

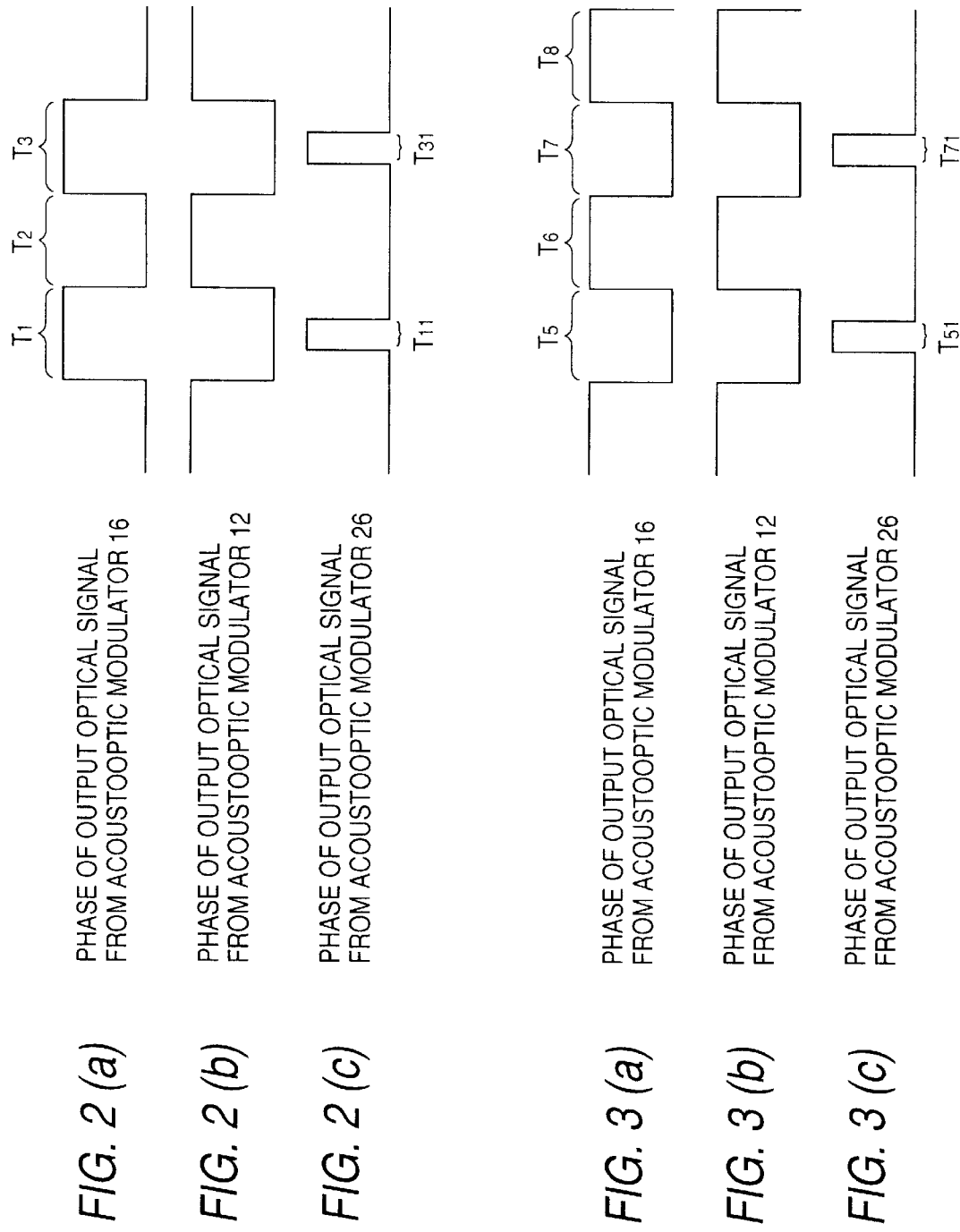

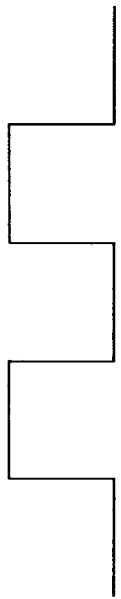
FIG. 5(a) PHASE OF OUTPUT OPTICAL SIGNAL FROM ACOUSTOOPTIC MODULATOR 56
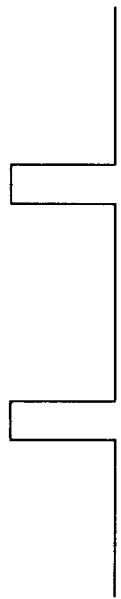
FIG. 5(b) PHASE OF OUTPUT OPTICAL SIGNAL FROM ACOUSTOOPTIC MODULATOR 64
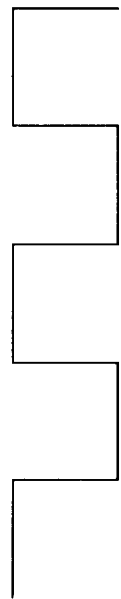
FIG. 6(a) PHASE OF OUTPUT OPTICAL SIGNAL FROM ACOUSTOOPTIC MODULATOR 56
FIG. 6(b) PHASE OF OUTPUT OPTICAL SIGNAL FROM ACOUSTOOPTIC MODULATOR 64

OPTICAL-FIBER-AMPLIFIER MEASURING APPARATUS

BACKGROUND OF THE INVENTION

1. Field of the Invention

The present invention relates to an optical-fiber-amplifier measuring apparatus for measuring various characteristics of an optical fiber amplifier.

2. Description of the Related Art

FIG. 4 is a block diagram illustrating the configuration of a conventional apparatus for measuring an optical fiber amplifier in accordance with a probe method.

In FIG. 4, reference numerals 50 and 52 denote light sources. A light source whose wavelength is variable is generally used as the light source 52. Meanwhile, a light source whose wavelength is fixed is generally used as the light source 50.

The output light from the light source 50 and the output light from the light source 52 are multiplexed by a photocoupler 54, and the multiplexed light is supplied to an acoustooptic modulator 56.

In addition to the output light from the photocoupler 54, a modulating signal, e.g., a low-frequency acoustic signal, is also inputted to the acoustooptic modulator 56, but the illustration of an apparatus for outputting the acoustic signal and a detailed description thereof will be omitted herein.

The acoustooptic modulator 56 effects intensity modulation with respect to an optical signal which is inputted. The optical signal which is outputted after being subjected to predetermined intensity modulation by the acoustooptic modulator 56 is converted to two demultiplexed light beams with an optical power ratio of, for instance, 1:1 by a photocoupler 58.

One of the demultiplexed light beams is inputted to an optical fiber amplifier to be measured (hereafter referred to as the subject optical fiber amplifier) 60 so as to be amplified with a predetermined gain.

The other demultiplexed light beam branched by the photocoupler 58 is inputted to one input terminal 63a of an optical switch 62, while the optical signal outputted from the subject optical fiber amplifier 60 is inputted to the other input terminal 63b of the optical switch 62.

The optical switch 62 selects either one of the optical signal inputted from the input terminal 63a and the optical signal inputted from the input terminal 63b, and outputs the same from an output terminal 63c. Under control by an unillustrated controller, the optical switch 62 selects either one of the optical signal inputted from the input terminal 63a and the optical signal inputted from the input terminal 63b, and outputs the same from the output terminal 63c.

The optical signal outputted from the output terminal 63c of the optical switch 62 is inputted to an acoustooptic modulator 64 where the optical signal is subjected to predetermined intensity modulation and is outputted.

It should be noted that, in the same way as the above-described acoustooptic modulator 56, in addition to the optical signal outputted from the optical switch 62, a modulating signal, e.g., a low-frequency acoustic signal, is also inputted to the acoustooptic modulator 64, but the illustration of an apparatus for outputting the acoustic signal and a detailed description thereof will be omitted herein.

Reference numeral 66 denotes an optical spectrum analyzer, which is used for measuring the optical power at the aforementioned portions. Further, numeral 68 denotes a reference optical power meter for calibrating the optical spectrum analyzer 66.

Next, a description will be given of a method for measuring various characteristics of the optical fiber amplifier by the optical-fiber-amplifier measuring apparatus shown in FIG. 4.

It should be noted that a description will be given here of a method of the various characteristics of the optical fiber amplifier in a case where light is outputted from light source 52 alone, so as to simplify the description.

The method for measuring various characteristics of the optical fiber amplifier by the configuration shown in FIG. 4 is called a "pulse method".

In the pulse method, signal optical power $P_{in}$ inputted to the subject optical fiber amplifier 60, signal optical power $P_{out}$ after amplification by the subject optical fiber amplifier 60, and power (power of an amplified spontaneous emission) $P_{ase}$ of spontaneously emitted light (ASE light) outputted from the subject optical fiber amplifier 60 are first measured by the optical spectrum analyzer 66, respectively.

After completion of the measurement, a gain G and a noise figure NF of the subject optical fiber amplifier 60 are calculated on the basis of the signal optical power $P_{in}$, the signal optical power $P_{out}$, and the power $P_{ase}$ of the amplified spontaneous emission. The following Formulae (1) and (2) are used as formulae of this calculation:

$$G = (P_{out} - P_{ase})/P_{in} \tag{1}$$

$$NF = (P_{ase}/h \cdot \gamma \cdot G \cdot \Delta\gamma) + (1/G) \tag{2}$$

It should be noted that, in Formula (2) above, h represents a Planck's constant, γ represents an optical frequency of the optical signal, and Δγ represents a measurement resolution of the optical spectrum analyzer 66.

FIGS. 5(a)–5(b) are diagrams illustrating the phase relationship between the modulated signal from the acoustooptic modulator 56 and the modulated signal from the acoustooptic modulator 64 at the time of measurement of the aforementioned signal optical power $P_{in}$ and $P_{out}$.

When measuring the signal optical power $P_{in}$ and $P_{out}$, the output light from the light source 52 is amplified by the subject optical fiber amplifier 60, and the power of each of the optical signals before the optical signal is inputted to the subject optical fiber amplifier 60 and after it is inputted thereto is measured. For this reason, the acoustooptic modulator 56 and the acoustooptic modulator 64 in terms of their phase relationship need to be set in the same phase.

Meanwhile, FIGS. 6(a)–6(b) are diagrams illustrating the phase relationship between the modulated signal from the acoustooptic modulator 56 and the modulated signal from the acoustooptic modulator 64 at the time of measurement of the power $P_{ase}$ of the amplified spontaneous emission.

The power $P_{ase}$ of the amplified spontaneous emission is the power of a spontaneously emitted light component (continuous light) outputted by the subject optical fiber amplifier 60.

Accordingly, to measure the power $P_{ase}$ of the amplified spontaneous emission, the subject optical fiber amplifier 60 needs to be set in a state in which an optical signal is not inputted to the subject optical fiber amplifier 60. For this purpose, it suffices if the phase relationship between the modulated signal from the acoustooptic modulator 56 and the modulated signal from the acoustooptic modulator 64 is set such that their phases assume opposite phases, as shown in FIGS. 6(a)–6(b), and it suffices if the power at a time when the optical signal is not being supplied to the subject optical fiber amplifier 60 is measured.

In addition, it is also necessary to effect evaluation by assuming a case where the wavelengths of the light are inputted to the subject optical fiber amplifier 60 after being multiplexed.

In this case, wavelength-division-multiplexing (WDM) signal light, in which wavelengths of light such as those shown in FIG. 7 are multiplexed, is inputted as the light source 50. Then, a light source whose wavelength is variable is used as the light source 52.

FIG. 7 is a diagram illustrating an example of the configuration of light sources for generating WDM signal light.

The example shown in FIG. 7 illustrates light sources for generating WDM signal light having four kinds of different central wavelengths.

In FIG. 7, reference 80a to 80d denote light sources for outputting optical signals with mutually different wavelengths $\lambda_1$–$\lambda_4$. Reference numerals 82a to 82d denote optical attenuators for attenuating the inputted light with predetermined attenuation indices.

The optical signals outputted from the light sources 80a to 80d are respectively inputted to their corresponding optical attenuators 82a to 82d to adjust their signal light levels.

The optical attenuators 82a to 82d are connected to a photocoupler 84. Accordingly, the optical signals outputted from the optical attenuators 82a to 82d are multiplexed by the photocoupler 84, and the multiplexed light is outputted as the WDM signal light. The outputted WDM signal light is inputted to the photocoupler 54 in FIGS. 2(a)–2(c).

The purpose of using the light source 50 is to set the subject optical fiber amplifier 60 in a saturated state, and the measurement of the gain G and the noise figure NF is effected by setting the wavelength of the variable-wavelength light source 52 to a targeted wavelength. This is referred to as the measurement based on the "probe method." Incidentally, the power of the optical output from the light source 50 side is generally set to be larger than the power of the optical output from the light source 52.

In the probe method according to the above-described conventional art, outputs from the light source 52 and the light source 50 are multiplexed by the photocoupler 54, and that light is inputted to the acoustooptic modulator 56.

Since the measurement is effected by setting the phase relationship to the one shown in FIGS. 5(a)–5(b), the output light from the light source 50 for setting the subject optical fiber amplifier 60 in a saturated state and the output light from the light source 52 are modulated at the same timing.

When the signal optical power $P_{in}$, the signal optical power $P_{out}$ after amplification by the subject optical fiber amplifier 60, and the power (power of an amplified spontaneous emission) $P_{ase}$ of spontaneously emitted light (ASE light) outputted from the subject optical fiber amplifier 60 are measured by the optical spectrum analyzer 66, the signal light components from the light source 50 and the light source 52 are inputted simultaneously. Therefore, in a case where the light source 50 and the light source 52 have the same wavelength components, the wavelengths are displayed in a superposed manner, so that there has been a problem in that measurement cannot be effected accurately. For this reason, it is necessary to provide a setting such that the wavelengths are not superposed on each other at the time of the measurement.

SUMMARY OF THE INVENTION

The present invention has been devised in view of the above-described circumstances, and its object is to provide an optical-fiber-amplifier measuring apparatus which is, during the probe method measurement, capable of measuring various characteristics of the optical fiber amplifier to be measured even if the wavelength settings of the light source for setting the subject optical fiber amplifier in a saturated state and the light source for effecting measurement are the same.

To overcome the above-described problem, in accordance with the present invention, there is provided an optical-fiber-amplifier measuring apparatus comprising: a first light source for measurement for measuring various characteristics of an optical fiber amplifier to be measured; first modulating means for modulating an optical signal inputted from the first light source to the optical fiber amplifier to be measured; a second light source for setting the optical fiber amplifier to be measured in a saturated state; and second modulating means for modulating an optical signal inputted from the second light source to the optical fiber amplifier to be measured.

In addition, the present invention is characterized in that in a case where the optical power of an input signal to the optical fiber amplifier to be measured and the optical power of an output signal from the optical fiber amplifier to be measured are measured, a phase of a modulated signal from the second modulating means and a phase of a modulated signal from the first modulating means are opposite phases.

In addition, the present invention is characterized in that in a case where the optical power of a spontaneous emission from the optical fiber amplifier to be measured is measured, a phase of a modulated signal from the second modulating means and a phase of a modulated signal from the first modulating means are the same phases.

In addition, the present invention is characterized in that the first modulating means and the second modulating means are acoustooptic modulators.

BRIEF DESCRIPTION OF THE DRAWINGS

FIGS. 2(a)–2(c) are diagrams illustrating the phase relationship among modulated signals from the acoustooptic modulator 16, the acoustooptic modulator 12, and the acoustooptic modulator 26 at the time of measurement of signal optical power $P_{in}$ and $P_{out}$;

FIGS. 3(a)–3(c) are diagrams illustrating the phase relationship among modulated signals from the acoustooptic modulator 16, the acoustooptic modulator 12, and the acoustooptic modulator 26 at the time of measurement of power $P_{ase}$ of an amplified spontaneous emission;

FIGS. 5(a)–5(b) are diagrams illustrating the phase relationship between a modulated signal from an acoustooptic modulator 56 and a modulated signal from an acoustooptic modulator 64 at the time of measurement of the signal optical power $P_{in}$ and $P_{out}$;

FIGS. 6(a)–6(b) are diagrams illustrating the phase relationship between the modulated signal from the acoustooptic modulator 56 and the modulated signal from the acoustooptic modulator 64 at the time of measurement of the power $P_{ase}$ of the amplified spontaneous emission.

DETAILED DESCRIPTION OF THE PREFERRED EMBODIMENTS

A description will be given hereinafter of an optical-fiber-amplifier measuring apparatus in accordance with an embodiment of the present invention with reference to the drawings.

Figure 1:
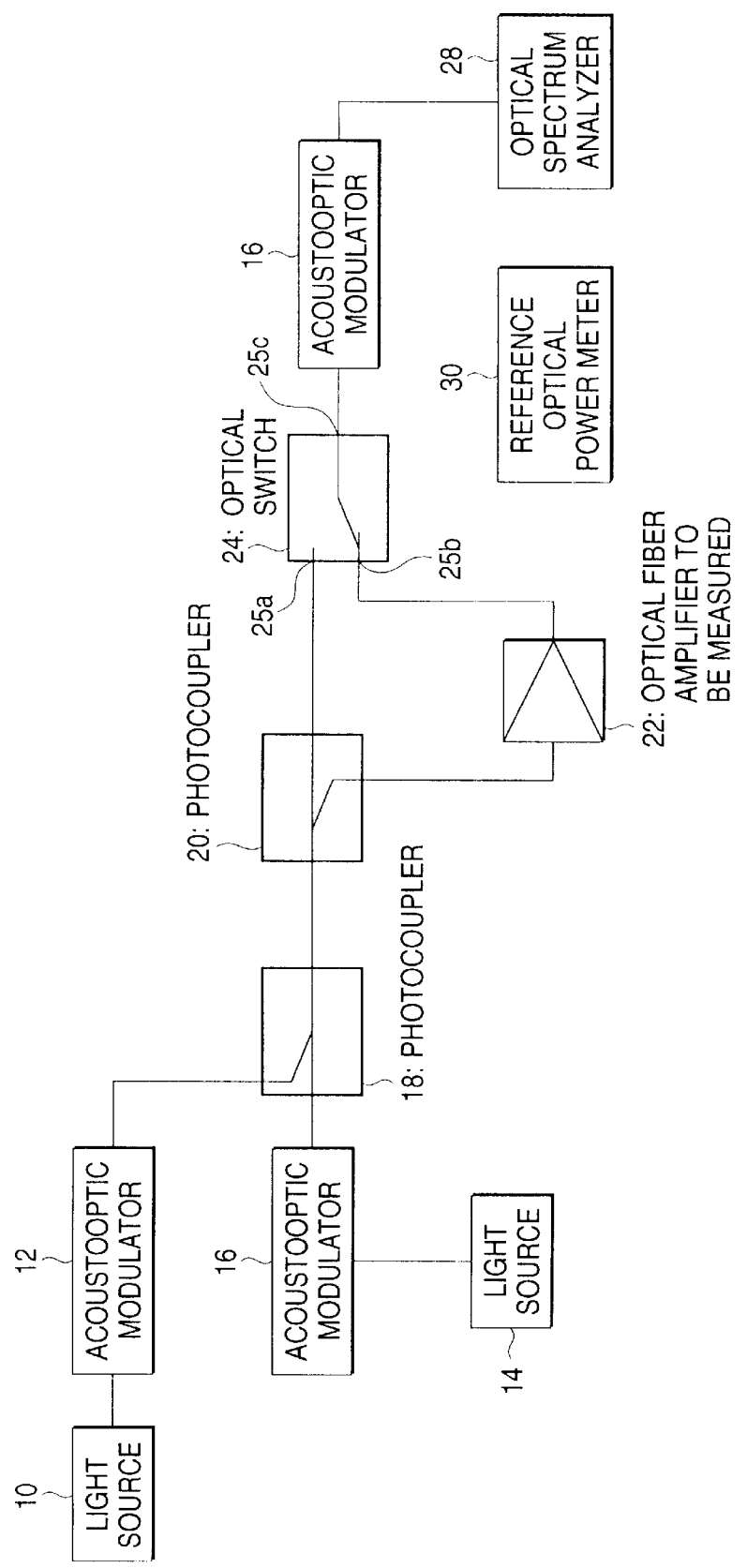
FIG. 1 is a block diagram illustrating the configuration of an optical-fiber-amplifier measuring apparatus in accordance with an embodiment of the present invention.
Figure 4:
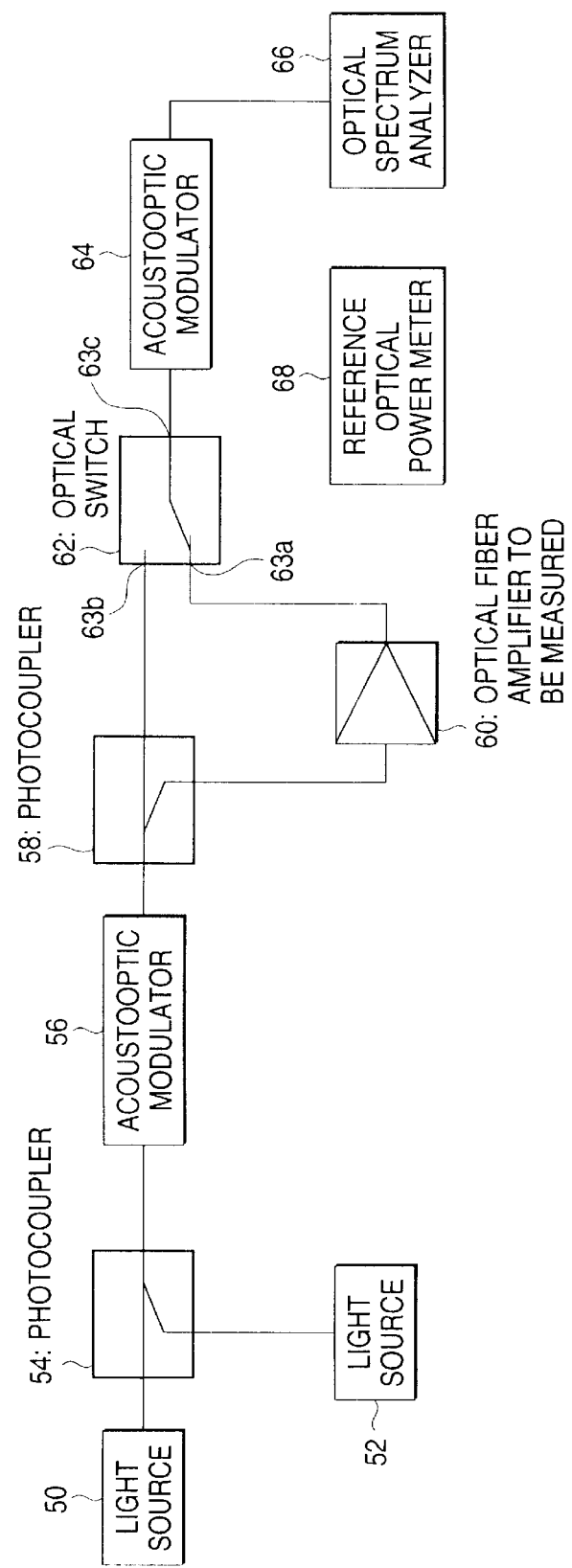
FIG. 4 is a block diagram illustrating the configuration of a conventional apparatus for measuring an optical fiber amplifier in accordance with a probe method.
Figure 7:
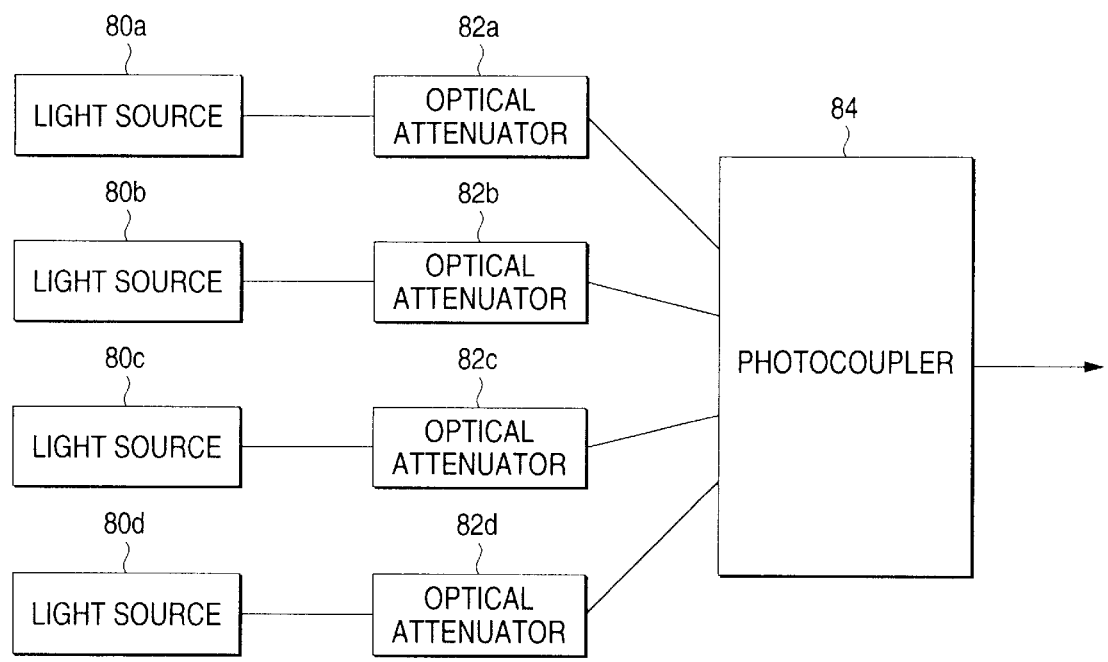
FIG. 7 is a diagram illustrating an example of the configuration of light sources for generating WDM signal light.

FIG. 1 is a block diagram illustrating the configuration of the optical-fiber-amplifier measuring apparatus in accordance with the embodiment of the present invention.

In FIG. 1, a light source 14 is a light source for measurement. The wavelength of the light outputted from the light source 14 is variable, and this light is inputted to an acoustooptic modulator 16.

A light source 10 is a light source for setting a subject optical fiber amplifier 22. The light source 10 outputs wavelength-multiplexed signal light including wavelengths $\lambda_1$–$\lambda_4$. The output of the light source 10 is inputted to an acoustooptic modulator 12.

In addition to the output light from the light sources 10 and 14, a modulating signal, e.g., a low-frequency acoustic signal, is also inputted to the acoustooptic modulators 12 and 16, but the illustration of an apparatus for outputting the acoustic signal and a detailed description thereof will be omitted herein.

The acoustooptic modulators 12 and 16 effect intensity modulation with respect to an optical signal which is inputted.

The optical signal outputted from the acoustooptic modulator 16 and the optical signal outputted from the acoustooptic modulator 12 are inputted to a photocoupler 18. The photocoupler 18 multiplexes the optical signal outputted from the acoustooptic modulator 16 and the optical signal outputted from the acoustooptic modulator 12, and outputs the same. A photocoupler 20 is connected to an output terminal of the photocoupler 18. The photocoupler 20 demultiplexes the input optical signal into two demultiplexed light beams with a power ratio of, for instance, 1:1.

One of the demultiplexed light beams is inputted to the subject optical fiber amplifier 22 so as to be amplified with a predetermined gain.

The other demultiplexed light beam is directly inputted to an input terminal 25a of an optical switch 24.

The optical signal amplified by the subject optical fiber amplifier 22 is inputted to the other input terminal 25b of the optical switch 24.

The optical switch 24 selects either one of the optical signal inputted from the input terminal 25a and the optical signal inputted from the input terminal 25b, and outputs the same from an output terminal 25c. Under control by an unillustrated controller, the optical switch 24 selects either one of the optical signal inputted from the input terminal 25a and the optical signal inputted from the input terminal 25b, and outputs the same from the output terminal 25c.

The optical signal outputted from the output terminal 25c of the optical switch 24 is inputted to an acoustooptic modulator 26 where the optical signal is subjected to predetermined intensity modulation and is outputted.

It should be noted that, in the same way as the above-described acoustooptic modulator 16, in addition to the optical signal outputted from the optical switch 26, a modulating signal, e.g., a low-frequency acoustic signal, is also inputted to the acoustooptic modulator 26, but the illustration of an apparatus for outputting the acoustic signal and a detailed description thereof will be omitted herein.

Reference numeral 28 denotes an optical spectrum analyzer, which is used for measuring the optical power at the aforementioned portions. Further, numeral 30 denotes a reference optical power meter for calibrating the optical spectrum analyzer 28.

Next, a description will be given of the procedure at the time of measuring the characteristics of the subject optical fiber amplifier 22 by using the optical-fiber-amplifier measuring apparatus of the above-described configuration in accordance with the embodiment of the present invention.

First, modulating signals are supplied to the acoustooptic modulator 16, the acoustooptic modulator 12, and the acoustooptic modulator 26 so as to set these acoustooptic modulators in modulating states. At the same time, the modulated signal from the acoustooptic modulator 16 and the modulated signal from the acoustooptic modulator 26 are set in the same phase, whereas the modulated signal from the acoustooptic modulator 12 is set in the opposite phase with respect to these acoustooptic modulators.

FIGS. 2(a)–2(c) are diagrams illustrating the phase relationship among modulated signals from the acoustooptic modulator 16, the acoustooptic modulator 12, and the acoustooptic modulator 26 at the time of measurement of the signal optical power $P_{in}$ and $P_{out}$.

Here, the wavelength of the light source 14 is set to the wavelength $l_1$, the input terminal 25a and the output terminal 25c of the optical switch 24 are connected, and the signal optical power $P_{in}$ is measured by the optical spectrum analyzer 28.

Next, the input terminal 25a and the output terminal 25c of the optical switch 24 are connected, and the signal optical power $P_{out}$ in a case where the subject optical fiber amplifier 22 is interposed is measured.

During the periods $T_1$ and $T_3$, only the optical signal outputted from the acoustooptic modulator 16, i.e., only the optical signal with the wavelength $\lambda_1$ emitted from the light source 14, is inputted to the acoustooptic modulator 26 via the photocoupler 18, the photocoupler 20, and the optical switch 24. During these periods, the optical signal outputted from the light source 10 is not made incident upon the acoustooptic modulator 26.

The light signal with the wavelength $\lambda_1$ incident upon the acoustooptic modulator 26 is outputted from the acoustooptic modulator 26 only during periods $T_1$ and $T_3$, and is inputted to the optical spectrum analyzer 28.

Accordingly, even if the wavelength of the optical signal outputted from the light source 10 and the wavelength of the optical signal outputted from the light source 12 are identical, the optical signal outputted from the light source 10 and the optical signal outputted from the light source 12 are not superposed on each other during the measurement of the signal optical power $P_{in}$ and $P_{out}$, so that the conventional problem can be overcome.

After performing the above-described measurement, while the acoustooptic modulator 16, the acoustooptic modulator 12, and the acoustooptic modulator 26 are kept in their modulating states, the phases of the modulated signal from the acoustooptic modulator 16 and the modulated signal from the acoustooptic modulator 26 are set in the opposite phases while the phase of the acoustooptic modulator 12 is kept intact.

FIGS. 3(a)–3(c) are diagrams illustrating the phase relationship among modulated signals from the acoustooptic modulator 16, the acoustooptic modulator 12, and the acoustooptic modulator 26 at the time of measurement of the power $P_{ase}$ of the amplified spontaneous emission.

Here, with respect to the wavelength $\lambda_1$, the power $P_{ase}$ of the amplified spontaneous emission is measured by the optical spectrum analyzer 28 by connecting the input terminal 25b and the output terminal 25c of the optical switch 24.

In the case where the power $P_{ase}$ of the amplified spontaneous emission is measured, the phases of the modulated signal from the acoustooptic modulator 16 and the modulated signal from the acoustooptic modulator 12 assume the same phase, as shown in FIGS. 3(a)–3(c). However, when the power $P_{ase}$ of the amplified spontaneous emission is measured, the measurement must be effected in a state in which these optical signals are not being inputted, so that no problem is presented even if the optical signal outputted from the light source 10 and the optical signal outputted from the light source 12 have the same wavelengths and are superposed on each other.

An important matter in the measurement of the power $P_{ase}$ of the amplified spontaneous emission is the state in which the optical signal outputted from the light source 10 and the optical signal outputted from the light source 12 are not inputted to the subject optical fiber amplifier 22. Referring to FIGS. 3(a)–3(c), during the periods $T_6$ and $T_8$, the optical signals outputted from the light source 10 and the light source 14 are both inputted to the acoustooptic modulator 26 via the photocoupler 18, the photocoupler 20, the subject optical fiber amplifier 22, and the optical switch 24.

However, since the phases of the modulated signals from the acoustooptic modulator 12 and the acoustooptic modulator 16 and the phase of the modulated signal from the acoustooptic modulator 26 are opposite, no optical signal is outputted from the acoustooptic modulator 26.

Meanwhile, during the periods $T_5$ and $T_7$, the optical signal outputted from the light source 10 and the optical signal outputted from the light source 12 are not outputted from the acoustooptic modulator 12 and the acoustooptic modulator 14, respectively, so that these optical signals are not incident upon the subject optical fiber amplifier 22.

However, since the subject optical fiber amplifier 22 is in the saturated state during the periods $T_5$ and $T_7$ and the like, the subject optical fiber amplifier 22 outputs the spontaneously emitted light even during the periods $T_5$ and $T_7$.

This spontaneously emitted light is inputted to the acoustooptic modulator 26 via the optical switch 24, and is incident upon the optical spectrum analyzer 28 from the acoustooptic modulator 26 during the periods $T_{51}$ and $T_{71}$. Therefore, the power $P_{ase}$ of the amplified spontaneous emission can be also measured without any problem.

Through the foregoing procedure, the signal optical power $P_{in}$ and $P_{out}$ and the power $P_{ase}$ of the amplified spontaneous emission are measured, a gain G and a noise figure NF of the subject optical fiber amplifier 22 at the wavelength $\lambda_1$ are calculated in accordance with Formulae (1) and (2) above on the basis of the signal optical power $P_{in}$ and $P_{out}$ and the power $P_{ase}$ thus measured.

Subsequently, the wavelength of the light source 14 is set to an arbitrary wavelength, e.g., wavelength $\lambda_2$, and measurement is effected in the same way as described above.

In the above, a description has been given of the optical-fiber-amplifier measuring apparatus in accordance with the embodiment of the present invention, but the present invention is not limited to the above-described embodiment, and modifications may be made freely within the scope of the present invention. For example, although the acoustooptic modulator 12, the acoustooptic modulator 14, and the acoustooptic modulator 26 are used in the above-described embodiment, the present invention is not limited to the same, and it goes without saying that electrooptic modulators and the like may be used.

As described above, in accordance with the present invention, it is possible to obtain an advantage in that even if wavelength settings of the light source for setting the subject optical fiber amplifier in a saturated state and the light source for effecting measurement are identical, measurement is made possible during the measurement based on the probe method.

What is claimed is:

1. An optical-fiber-amplifier measuring apparatus comprising:
    a first light source measurement for measuring various characteristics of an optical fiber amplifier to be measured;
    first modulating means for modulating an optical signal inputted from said first light source to said optical fiber amplifier to be measured;
    a second light source for setting said optical fiber amplifier to be measured in a saturated state; and
    second modulating means for modulating an optical signal inputted from said second light source to said optical fiber amplifier to be measured.

2. The optical-fiber-amplifier measuring apparatus according to claim 1, wherein in a case where the optical power of an input signal to said optical fiber amplifier to be measured and the optical power of an output signal from said optical fiber amplifier to be measured are measured, a phase of a modulated signal from said second modulating means and a phase of a modulated signal from said first modulating means are opposite phases.

3. The optical-fiber-amplifier measuring apparatus according to claim 1, wherein in a case where the optical power of a spontaneous emission from said optical fiber amplifier to be measured is measured, a phase of a modulated signal from said second modulating means and a phase of a modulated signal from said first modulating means are the same phases.

4. The optical-fiber-amplifier measuring apparatus according to claim 1, wherein said first modulating means and said second modulating means are acoustooptic modulators.

* * * * *